United States Patent
Kim et al.

(10) Patent No.: US 8,741,791 B2
(45) Date of Patent: Jun. 3, 2014

(54) CRYSTALLIZED GLASS WITH NEGATIVE COEFFICIENT OF THERMAL EXPANSION AND METHOD FOR MANUFACTURING THE SAME

(75) Inventors: Tae Heung Kim, Busan (KR); Duck Ki Yoon, Busan (KR); Kang Taek Lee, Busan (KR); Hyung Sik Lim, Busan (KR); Ki Tae Kim, Busan (KR)

(73) Assignee: Jeongkwan Co., Ltd, Gyeongsangnam-do (KR)

( * ) Notice: Subject to any disclaimer, the term of this patent is extended or adjusted under 35 U.S.C. 154(b) by 63 days.

(21) Appl. No.: 13/225,561

(22) Filed: Sep. 6, 2011

(65) Prior Publication Data

US 2012/0058876 A1    Mar. 8, 2012

(30) Foreign Application Priority Data

Sep. 6, 2010    (KR) ........................ 10-2010-0087026

(51) Int. Cl.
*C03C 10/12*    (2006.01)

(52) U.S. Cl.
USPC .................................... 501/4; 501/7; 65/33.8

(58) Field of Classification Search
USPC ........................................... 501/4, 7; 65/33.8
See application file for complete search history.

(56) References Cited

U.S. PATENT DOCUMENTS

| 4,507,392 | A | | 3/1985 | Rittler |
| 5,320,792 | A | * | 6/1994 | Wu et al. ........................ 264/621 |
| 6,066,585 | A | * | 5/2000 | Swartz ............................ 501/128 |
| 2011/0130264 | A1 | * | 6/2011 | Beall ................................ 501/4 |

FOREIGN PATENT DOCUMENTS

| CN | 1341085 A | 3/2002 |
| CN | 1345700 A | 4/2002 |
| CN | 1871179 A | 11/2006 |
| JP | 05-009039 | 1/1993 |
| JP | 2000266943 | 9/2000 |
| JP | 2000313654 | 11/2000 |
| JP | 2000351667 | 12/2000 |
| JP | 2001172048 | 6/2001 |
| JP | 2002104841 | 4/2002 |

OTHER PUBLICATIONS

Solid state reaction route, definition downloaded May 20, 2013.*

* cited by examiner

*Primary Examiner* — Karl Group
(74) *Attorney, Agent, or Firm* — Julio M. Loza; Loza & Loza, LLP

(57) ABSTRACT

A crystallized glass with negative coefficient of thermal expansion includes 38 wt % to 64 wt % of silica ($SiO_2$); 30 wt % to 40 wt % of alumina ($Al_2O_3$); and 5 wt % to 12 wt % of lithium oxide ($Li_2O$) as a basic component, and further includes more than one component selected from the group consisting of 0.5 wt % to 15 wt % of zirconia ($ZrO_2$), 0.5 wt % to 6.5 wt % of titanium dioxide ($TiO_2$), 0.5 wt % to 4 wt % of phosphorus pentoxide ($P_2O_5$), 2 wt % to 5 wt % of magnesium oxide (MgO), and 0 wt % to 5 wt % of magnesium fluoride ($MgF_2$) in addition to the basic components. The crystallized glass may have a high negative coefficient of thermal expansion so that it has an advantage that it can be used as a thermal expansion compensation material according to the temperatures of all kinds of glasses and similar products thereof.

5 Claims, 2 Drawing Sheets

US 8,741,791 B2

CRYSTALLIZED GLASS WITH NEGATIVE COEFFICIENT OF THERMAL EXPANSION AND METHOD FOR MANUFACTURING THE SAME

CLAIM OF PRIORITY

The present invention claims priority of Korean Patent Application No. 10-2010-0087026, filed on Sep. 6, 2010, is assigned to JEONGKWAN CO. LTD and which is incorporated herein by reference.

BACKGROUND OF THE INVENTION

1. Field of the Invention

The present invention relates to a crystallized glass and a method for manufacturing the same, and more specifically, to a crystallized glass with the maximum negative coefficient of thermal expansion and a method for manufacturing the same, in which the crystallized glass has large crystals while its residual hyaline is minimized by selecting an optimum sintering temperature, and the like, according to weight ratios of raw materials used in glass manufacture, and solid-state reaction.

2. Description of Related Art

In general, a crystallized glass is a complex of crystals and glass, and generally obtained through a heat treatment after melting and molding raw materials used in glass manufacture.

The crystallized glass has often various properties that cannot be obtained from glass, and especially has an excellent thermal resistant thereby exhibiting low coefficient of thermal expansion. Therefore, it can be used for cooking utensils, a cuisson's top plate, a heater panel, and the like, and also used for a reflector of a telescope, raw materials for precision apparatus components, a wavelength filter, a coupler, or a waveguide of optical communication, and the like due to its good processability.

Especially, for the field of electronic materials, it is being well applied as a thermal expansion compensation material according to temperature changes of sealing, all kinds of substrates, and compositions so that recently there have been many experiments about a crystallized glass with negative coefficient of thermal expansion.

U.S. Pat. No. 4,209,229 discloses a crystallized glass, which has is β-eucryptite and β-quartz solid solution as a main crystal phase. However, the above crystallized glass has problems, such as very high crystallization temperature and about $-2 \times 10^{-7}/^\circ$ C. of negative coefficient of thermal expansion that is not sufficient.

U.S. Pat. No. 4,507,392 discloses a transparent crystallized glass containing β-quartz solid solution, which is suitable for decoration glaze of ceramics, as a main crystal phase. However, the crystallized glass has a great volume of nucleating agent so that it is difficult to get high negative coefficient of thermal expansion.

JP-A-2-208256 Laying-Open Gazette discloses ZnO—$Al_2O_3$—$SiO_2$-based low thermal expansion ceramic that has β-quartz solid solution and/or Zn petalite solid solution as a main crystal phase. However, the above ceramic has a problem, such as $-21.5 \times 10^{-7}/^\circ$ C. of the lowest coefficient of thermal expansion that is not sufficient.

Furthermore, a method for manufacturing all of the above mentioned crystallized glasses includes precipitating crystals by re-heating a parent glass after manufacturing the parent glass by melting raw materials used in glass manufacture at high temperature. However, when a step of vitrification is performed at high temperature as mentioned above, it is a limitation on mass-production due to a considerable time and onerousness need for performing the method at high temperature.

SUMMARY OF THE INVENTION

A technical object according to the present invention to solve is to provide a crystallized glass with high negative coefficient of thermal expansion.

Another technical object according to the present invention to solve is to provide a method for manufacturing a crystallized glass with negative coefficient of thermal expansion, without a step of vitrification by firstly melting the raw materials used in glass manufacture at high temperature, in which the method is possible to allow for mass-production and reduce manufacturing costs.

A method for manufacturing a crystallized glass according to the present invention in order to achieve the above technical objects include (a) weighing and mixing compositions, (b) calcinating the mixed compositions, (c) sintering the calcinated compositions, and (d) slow-cooling the sintered compositions at room temperature, in which the compositions include 38 wt % to 64 wt % of silica ($SiO_2$), 30 wt % to 40 wt % of alumina ($Al_2O_3$), and 5 wt % to 12 wt % of lithium oxide ($Li_2O$) as a basic component, and further include more than one component selected from the group consisting of 0.5 wt % to 15 wt % of zirconia ($ZrO_2$), 0.5 wt % to 6.5 wt % of titanium dioxide ($TiO_2$), 0.5 wt % to 4 wt % of phosphorus pentoxide ($P_2O_5$), 2 wt % to 5 wt % of magnesium oxide (MgO), and 0 wt % to 5 wt % of magnesium fluoride ($MgF_2$) in addition to the above basic components.

BRIEF DESCRIPTION OF THE DRAWINGS

The above and other objects, features and advantages of the present invention will become apparent from the following description of preferred embodiments given in conjunction with the accompanying drawings, in which.

DESCRIPTION OF SPECIFIC EMBODIMENTS

Figure 1:
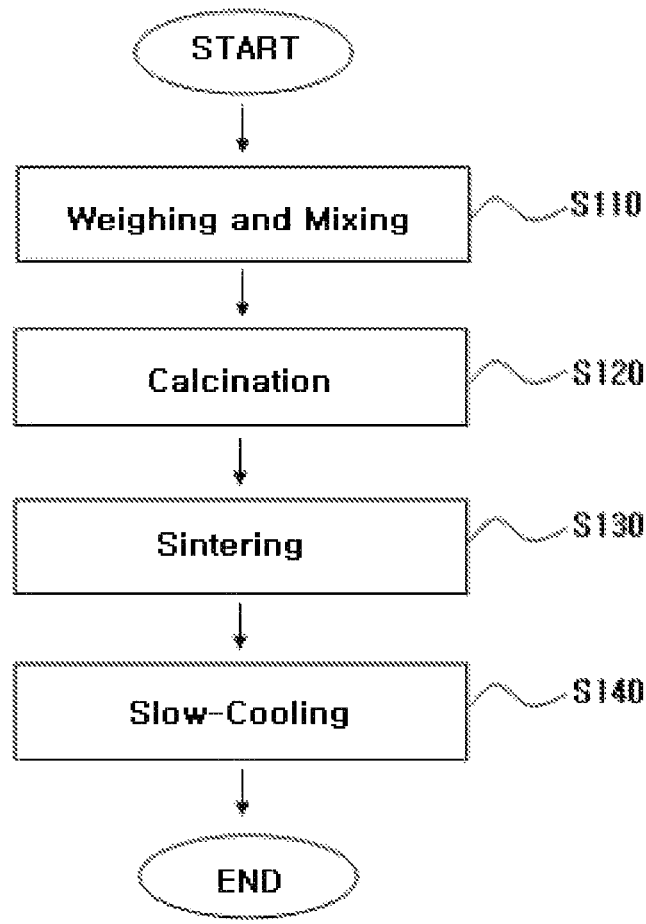
FIG. 1 is a flow chart showing a method for manufacturing a crystallized glass according to an embodiment of the present invention.
Figure 2:
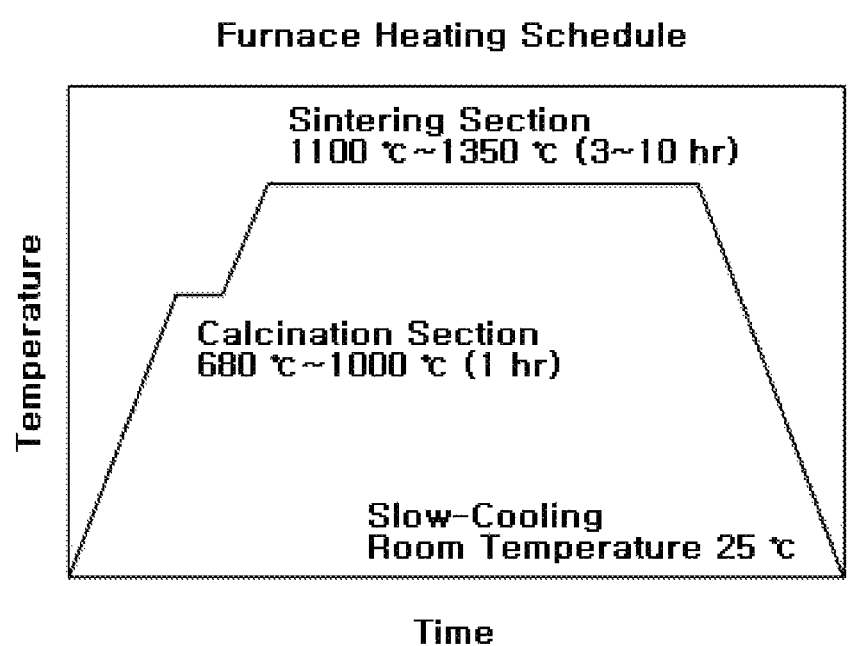
FIG. 2 is a schedule chart explaining a method for manufacturing a crystallized glass according to the present invention.

The advantages, features and aspects of the invention will become apparent from the following description of the embodiments with reference to the accompanying drawings, which is set forth hereinafter.

Hereinafter, the embodiments of the present invention will be described in detail with reference to accompanying drawings.

For the present specification, the term "main crystal phase" includes the whole crystal phases with relatively high precipitation ratio. That is, the main crystal phase is at least 30 of diffraction intensity ratio of main peak of each precipitation crystal phase if X-Ray diffraction intensity of main peak of crystal phases precipitated in highest precipitation ratio in X-Ray Chart of X Diffraction (the axis of ordinates is Diffraction Intensity and the axis of abscissas is Diffraction Angle) is 100. Here, the ratio of diffraction intensity of crystals besides the main crystal phase preferably is less than 20, and most preferably less than 5.

In addition, the term "average crystal particle diameter" indicates an average value of sizes of crystal particles consisting polycrystal, and the term "coefficient of thermal expansion refers to average linear thermal expansion.

The crystallized glass according to the present invention is consisted of more than one selected from the group consisting of eucryptite ($\beta$-$Li_2O.Al_2O_2.2SiO_2$), $\beta$-spodumene ($\beta$-$Li_2O.Al_2O_3.4SiO_2$), $\beta$-quartz ($\beta$-$SiO_2$), virgilite ($Li_2O.Al_2O_3.6SiO_2$) and petalite ($Li_2O.Al_2O_3.4SiO_2$).

Furthermore, the average crystal particle diameter of the main crystal phase is less than 10 um, and the average coefficient of thermal expansion is $-40\times10^{-7}/°$ C. to $-110\times10^{-7}/°$ C. at the range of 50° C. to 400° C. temperatures.

The crystallized glass according to the present invention has 38 wt % to 64 wt % of silica ($SiO_2$), 30 wt % to 40 wt % of alumina ($Al_2O_3$), and 5 wt % to 12 wt % of lithium oxide ($Li_2O$) as a basic component, and further includes more than one component selected from the group consisting of 0.5 wt % to 15 wt % of zirconia ($ZrO_2$), 0.5 wt % to 15 wt % of titanium dioxide ($TiO_2$), 0.5 wt % to 4 wt % of phosphorus pentoxide ($P_2O_5$), 2 wt % to 5 wt % of magnesium oxide (MgO), and 0 wt % to 5 wt % of magnesium fluoride ($MgF_2$) in addition to the above basic components.

Generally, lithium oxide ($Li_2O$), which is a constituent of main crystal phase, plays a role in reducing a viscosity and giving a good meltability. The range of its content preferably is 5% to 12%; and when the content is less than 5%, the melting point is increased and it is difficult to get a main crystal phase; and when the content exceeds 12%, the melting point is decreased so that the main crystal phase is unstable and its chemically durability is deteriorated.

Silica ($SiO_2$) is a constituent of main crystal phase with negative coefficient of thermal expansion. The range of its content preferably is 38% to 64%; and when the content is less than 38%, it is difficult to get the main crystal phase and other crystal phase with low negative coefficient of thermal expansion is precipitated according to the content ratios of other compositions. When the content exceeds 64%, the melting point is decreased and vitrification is easily performed so that it is hard to precipitate crystals.

In addition, when the range of lithium oxide ($Li_2O$) or silica ($SiO_2$) exceeds the range of the content according to the present invention, the melting point is decreased thereby vitrificating a reactant so that there is a problem that the reactant is adhered to an aluminum furnace.

Furthermore, when the content exceeds the range of the above content, even though a sample that is already vitrificated is again heat-treated to precipitate crystals, there is still a residual hyaline so that the negative coefficient of thermal expansion does not become its maximum value.

Alumina ($Al_2O_3$) is a necessary component of main crystal phase. The range of its content preferably is 30% to 40%; when the content is less than 30%, the amount of main crystal phase become small so that it is difficult to get the desired negative coefficient of thermal expansion; and when the content exceeds 40%, the temperature for a nucleus growth becomes high and the undesired other crystal phases are produced.

Zirconia ($ZrO_2$) acts as a nucleating agent, and also plays roles in refining the grown crystal particles, improving a mechanical strength, and improving a chemically durability of material. The preferable range of its content is 0.5% to %; and when it is less than 0.5%, high negative coefficient of thermal expansion cannot be obtained; and when it exceeds 15%, the sintering temperature becomes high and the mechanical strength becomes very strong so that the processability is significantly deteriorated.

Titanium dioxide ($TiO_2$) acts as a nucleating agent of glass like zirconia ($ZrO_2$). The preferable range of its content is 0.5% to 4%; and when it is less than 0.5%, high negative coefficient of thermal expansion cannot be obtained; and when it exceeds 4%, the melting point becomes low so that a viritification is easily performed and alumina titanate ($Al_2O_5TiO_2$) crystals with low value of negative coefficient of thermal expansion are precipitated.

Phosphorus pentoxide ($P_2O_5$) plays an important role as a nucleating agent of glass. The preferable range of its content is 2% to 5%; and when it is less than 2%, the initial nucleating temperature becomes high thereby increasing the sintering temperature; at least 2% should be added to reduce the nucleating temperature and give a good reactivity of the initial nucleating; and when it exceeds 5%, the melting point becomes low so that a vitrification is easily performed and the desired properties can be obtained by reacting with a furnace.

Magnesium oxide (MgO) is a constituent of $\beta$-eucryptite solid solution and $\beta$-quartz solid solution, and used as stabilizer and sintering strength. The preferable range of its content is 2% to 5%. When it is less than 2%, the sintering temperature becomes low and the nucleating velocity becomes slow so that the time for heat-treating stretched, and when it exceeds 5%, the melting point becomes low so that a vitrification is easily performed.

The preferable range of Magnesium fluoride ($MgF_2$) content is 0% to 5%, and plays a similar role as that of magnesium oxide (MgO).

The crystallized glass with the composition as mentioned above according to the present invention is manufactured by the method as follows.

FIG. 1 is a flow chart showing a method for manufacturing the crystallized glass according to an embodiment of the present invention.

Referring to FIG. 1, the method for manufacturing the crystallized glass according to an embodiment of the present invention includes weighing and mixing S110, calcinating S120, sintering S130, and slow-cooling S140.

For weighing and mixing S110, raw materials used in glass manufacture, such as oxide, carbonate, and the like, are weighed and then added to an alumina furnace to mix the above compositions with predetermined weight ratios. At this time, the total sum of weight ratios may be 100 wt %.

In addition, a solid-state reaction is performed to homogeneously mix the raw materials. The solid-state reaction is published before filing in the field of chemical and material engineering and variously being performed so that the detailed description about it will be omitted.

For an embodiment of method for manufacturing the crystallized glass according to the present invention, the raw materials with a powder phase used in glass manufacture were injected to V-Mixer; a rotation was performed for a predetermined time in order to sufficiently mix; the well mixed raw materials were charged to the alumina furnace; and the temperature in the alumina furnace was increased with 10° C./min.

A sol-gel method and re-heating method after melting a glass that are the general method for manufacturing a crystallized glass are complicated and their sintering temperatures are high. Especially, it was difficult to get very high negative coefficient of thermal expansion due to a residual hyalin and second phase.

However, for the method for manufacturing the crystallized glass according to the present invention, it could be determined that the solid-state reaction was used in the step for mixing the raw materials used in glass manufacture so that its process was simple and also finally there were no the residual hyalin thereby obtaining the maximum negative coefficient of thermal expansion. Furthermore, the process for manufacturing the crystallized glass is very simple so that it is easily mass-produced and commercialized.

A step for calcinating refers to an operate for removing a part or all of volatile components, including increasing the temperature with 10° C./min from room temperature (25° C.) and then calcinating for 1 hour at 680° C. to 1000° C.

At this time, lithium carbonate ($Li_2CO_3$) may be used instead of lithium oxide ($Li_2O$). Lithium carbonate ($Li_2CO_3$) is cheaper and when calcinating it, $CO_2$ is gasificated to volitilize so that it has the same effect as that of lithium oxide ($Li_2O$).

In addition, even though the calcinations temperature and crystal nucleation temperature are different according to the composition ratios of raw materials used in glass manufacture, it seems that the calcinations and crystal nucleation are almost simultaneously occurred at the above range of temperature in the method for manufacturing the crystallized glass according to an embodiment of the present invention. Therefore, for the present invention, some composition making crystal nucleus may be reacted at the calcinations step S120, and this may help to quickly form and grow the crystal nucleuses at the following sintering step S130.

A step for sintering S130 is performed for 3° C. o 10 hours at 1100° C. to 1350° C. by again increasing with 10° C./min after calcinating S120. The sintering temperature may be different according to the compositions of raw materials used in glass manufacture; and when the temperature is low, the sintering time is set to be long to maximize the reaction.

Generally, for the crystallized glass, formation and growth of the nucleus are occurred according to the composition ratios of raw materials used in glass manufacture and the maximum crystal growth is occurred in the range of the general sintering temperatures. However, for LAS-based crystallized glass, the range of the sintering temperatures is narrow and is close to the melting point of glass so that it is difficult to sinter.

However, the method for manufacturing LAS-based crystallized glass according to the present invention uses the optimum range of sintering temperatures to have the maximum negative coefficient of thermal expansion by varying the composition ratios of raw materials used in glass manufacture. That is, it was confirmed that the vitrification of the raw materials used in glass manufacture is locally performed at the maximum sintering temperatures so that the crystal nucleuses are quickly grown inside the same to have the maximum negative coefficient of thermal expansion.

A step for slow-cooling S140 is slowly performed to room temperature in order to prevent heat shock between the furnace and a heating element and stress occurred at the specimen, in which the heat shock and the stress may be occurred when quick-cooling.

Hereinafter, the crystallized glass with negative coefficient of thermal expansion according to the present invention will be described based on Examples. In addition, the present invention will not be limited to Examples.

Table 1 shows the compositions and the weight ratios thereof of the crystallized glasses (Example 1 to Example 6) according to the present invention, and Table 2 shows the compositions and the weight ratios thereof of the crystallized glasses (Comparative Example 1 to Comparative Example 4) that may be compared with the above Examples. And, there are coefficients of thermal expansion of the specimen of each crystallized glass in Table 1 and Table 2.

The methods for manufacturing the crystallized glasses according to Examples and Comparative Examples disclosed in Table 1 and Table 2 are as follows.

Firstly, the raw materials, such as oxide, carbonate, and the like, used in glass manufacture were weighed to be the composition ratios as disclosed in Table 1 and Table 2, and added to the furnace for the above compositions. At this time, the weighing, grinding, and mixing were performed through the solid-state reaction, and then increased at room temperature.

Next, the calcinations were performed for 1 hour at 1000° C. in order to remove the reactive gases using the alumina furnace. The above temperature is the sintering temperature and also to form the crystal nucleuses. Therefore, the process mainly means the calcinations process, but at the same time, is to form the crystal nucleuses so that it has an effect that it can allow to decrease the whole process.

And then, the temperature was again increased with 10° C./min to maintain at 1100° C. to 1350° C.

For Example 1, the temperature was maintained for 6 hours at 1350° C. and for Example 2, it was maintained for 3 hours due to a large quantity of zirconia ($ZrO_2$). Since when the amount of zirconia was maximally 19% and the heat treatment was performed for 10 hours, the sintered body was too strong so that it was difficult to grind and its properties were deteriorated, its amount was limited to 15%.

For Example 3, it was maintained for 7 hours at 1250° C.; for Example 4, it was maintained for 10 hours at 1150° C.; for Example 5, it was maintained for 10 hours at 1100° C.; and for Example 6, it was maintained for 5 hours at 1300° C. Also, the above range of sintering temperatures were maintained and experimented for Comparative Examples.

For the method for manufacturing the crystallized glass with negative coefficient of thermal expansion according to the present invention, the maximum sintering temperature could be found in order to obtain the maximum negative coefficient of thermal expansion according to the component ratios of composition, that is, each raw material used in glass manufacture. However, it could be found that when the component ratios of the composition were used for Comparative Examples, the high negative coefficient of thermal expansion could not be obtained even though the sintering temperature and time were varied.

For Examples according to the present invention, the maximum sintering temperature was different according to the component ratios of the compositions, and when the sintering temperature was lower than the maximum sintering temperature, the sintering time was set to be long so that the maximum negative coefficient of thermal expansion could be obtained.

Finally, the slow-cooling was performed for 2 hours from high temperature to room temperature (25° C.), the specimen with a diameter of 5 mm and a length of 10 mm was prepared, and then the average value of coefficient of thermal expansion was measured and calculated at the range of temperature of 50° C. to 400° C. using TMA Q400 Thermal Analysis Apparatus available from TA INSTRUMENTS Company.

TABLE 1

| | (wt %) | | | | | | | | Coefficient of Thermal Expansion ($\times 10^{-7}/°$ C.) |
|---|---|---|---|---|---|---|---|---|---|
| | $Li_2O$ | $Al_2O_3$ | $SiO_2$ | $ZrO_2$ | $TiO_2$ | $P_2O_5$ | MgO | $MgF_2$ | |
| Example 1 | 12 | 35.5 | 52.5 | | | | | | −57.3 |
| Example 2 | 10 | 32 | 38 | 15 | 2.5 | 2.5 | | | −44.9 |
| Example 3 | 11 | 40.5 | 39.5 | 5 | 2 | | 2 | | −110.2 |
| Example 4 | 9.8 | 33.5 | 39.4 | 6.8 | 6.5 | 4 | | | −53.0 |

TABLE 1-continued (wt %)

| | $Li_2O$ | $Al_2O_3$ | $SiO_2$ | $ZrO_2$ | $TiO_2$ | $P_2O_5$ | MgO | $MgF_2$ | Coefficient of Thermal Expansion ($\times 10^{-7}/°$ C.) |
|---|---|---|---|---|---|---|---|---|---|
| Example 5 | 11 | 39 | 45 | | | | 5 | | −64.8 |
| Example 6 | 11 | 39 | 45 | | | | | 5 | −52.8 |

TABLE 2

(wt %)

| | $Li_2O$ | $Al_2O_3$ | $SiO_2$ | $ZrO_2$ | $TiO_2$ | $P_2O_5$ | MgO | $MgF_2$ | Coefficient of Thermal Expansion ($\times 10^{-7}/°$ C.) |
|---|---|---|---|---|---|---|---|---|---|
| Com. Ex. 1 | 5.53 | 16.32 | 64.14 | | 14.22 | | | | 14.8 |
| Com. Ex. 2 | 5.53 | 16.32 | 64.14 | 14.22 | | | | | −2.6 |
| Com. Ex. 3 | 5.53 | 16.32 | 64.14 | 7.11 | 7.11 | | | | −16 |
| Com. Ex. 4 | 5.53 | 15.33 | 62.14 | 6 | 6 | | 5 | | −0.5 |

Referring to Table 1 and Table 2, it could be found that the average coefficient of thermal expansion was about $-40 \times 10^{-7}/°$ C. to $-110 \times 10^{-7}/°$ C. in the case of Example 1 to Example 6 according to the present invention so that its negative coefficient of thermal expansion was significantly higher than that of Comparative Example 1 to Comparative Example 4 with the different content ranges of compositions.

That is, the experiment for Comparative Example 1 was performed with excess titanium dioxide ($TiO_2$), and the experiment for Comparative Example 2 was performed with excess zirconia ($ZrO_2$). In this case, as the amounts of titanium dioxide ($TiO_2$) and zirconia ($ZrO_2$) are increasing, the melting point is decreasing so that the vitrification is easily occurred. Resultantly, it could be found that the manufactured crystallized glass had many residual hyalin and the crystal nucleuses were not sufficiently formed so that negative coefficient of thermal expansion or positive coefficient of thermal expansion was obtained.

In addition, for each Comparative Example, it could be also found that the experiments were performed in excess of the content range of silica ($SiO_2$) according to the present invention, but negative coefficient of thermal expansion or positive coefficient of thermal expansion could be also obtained.

For example, when being out of the content range of other $Li_2O$ or $Al_2O_3$ according to the present invention, the amount of $Li_2O$ is increasing, the residual hyalin is increasing so that negative coefficient of thermal expansion is not obtained. The reason is generally that when the amount of $Li_2O$ is large, the melting point is low according to LAS glass composition.

The amount of $Li_2O$ has reduced and the amount of $Al_2O_3$ has increased, the sintering temperature has increased so that the sintering time becomes long and $Al_2O_3$ and $SiO_2$ are reacted to each other so that a great quantity of zeolite crystals with low negative coefficient of thermal expansion are produced thereby decreasing the degree of negative coefficient of thermal expansion.

According to the documents, it could be found that negative coefficient of thermal expansion of the crystal of zeolite is about $-20 \times 10^{-7}/°$ C. so that as the content amount of $Al_2O_3$ is increasing, the amount of eucryptite is decreasing and the amount of zeolite is increasing so that the value of negative coefficient of thermal expansion is decreased.

A crystallized glass according to the present invention has maximum negative coefficient of thermal expansion by producing large crystals while minimizing a residual hyaline through a specific manufacturing method, such as solid-state reaction, and the like, so that it has a advantage to be used as a thermal expansion compensation material according to temperatures of all kinds of glasses and a product just like glasses.

In addition, there are advantages that a method for manufacturing a crystallized glass according to the present invention is easily possible to allow a mass-production because of not using firstly a step of vitrification and to reduce manufacturing costs because there is no reactivity with a manufacturing vessel when manufacturing it.

While the present invention has been described with respect to the specific embodiments, it will be apparent to those skilled in the art that various changes and modifications may be made without departing from the spirit and scope of the invention as defined in the following claims.

What is claimed is:

1. A method for manufacturing a crystallized glass with negative coefficient of thermal expansion, comprising
  (a) weighing and mixing compositions;
  (b) calcining the mixed compositions;
  (c) sintering the calcined compositions; and
  (d) slow-cooling the sintered compositions;
  wherein the compositions includes 38 wt % to 64 wt % of silica ($SiO_2$), 30 wt % to 40 wt % of alumina ($Al_2O_3$), and 5 wt % to 12 wt % of lithium oxide ($Li_2O$) as a basic component, and further includes more than one component selected from the group consisting of 0.5 wt % to 15 wt % of zirconia ($ZrO_2$), 0.5 wt % to 6.5 wt % of titanium dioxide ($TiO_2$), 0.5 wt % to 4 wt % of phosphorus pentoxide ($P_2O_5$), and 0.1 wt % to 5 wt % of magnesium fluoride ($MgF_2$) in addition to any other components.

2. A method for manufacturing a crystallized glass with negative coefficient of thermal expansion, comprising
  (a) weighing and mixing compositions;
  (b) calcining the mixed compositions;
  (c) sintering the calcined compositions; and
  (d) slow-cooling the sintered compositions;
  wherein the compositions includes 38 wt % to 64 wt % of silica ($SiO_2$), 30 wt % to 40 wt % of alumina ($Al_2O_3$), and 5 wt % to 12 wt % of lithium carbonate ($Li_2CO_3$) as a basic component, and further includes more than one component selected from the group consisting of 0.5 wt % to 15 wt % of zirconia ($ZrO_2$), 0.5 wt % to 6.5 wt % of titanium dioxide (TiO$_2$), 0.5 wt % to 4 wt % of phosphorus pentoxide (P$_2$O$_5$), and 0.1 wt % to 5 wt % of magnesium fluoride (MgF$_2$) in addition to any other components.

3. The method for manufacturing the crystallized glass with negative coefficient of thermal expansion according to claim 1, wherein in the step (b), a calcining temperature is 680° C. to 1000° C. and a calcining time is 1 hour.

4. The method for manufacturing the crystallized glass with negative coefficient of thermal expansion according to claim 1, wherein in the step (c), a sintering temperature is 1100° C. to 1350° C. and a sintering time is 3 hours to 10 hours.

5. The method for manufacturing the crystallized glass with negative coefficient of thermal expansion according to claim 1, wherein the step (d) is performed for 2 hours at room temperature (25° C.).

* * * * *